(12) United States Patent
Schmidt

(10) Patent No.: US 7,946,946 B2
(45) Date of Patent: May 24, 2011

(54) PRELOADED DIFFERENTIALS

(75) Inventor: Carl Schmidt, Brier, WA (US)

(73) Assignee: Randy's Ring & Pinion, Everett, WA (US)

( * ) Notice: Subject to any disclaimer, the term of this patent is extended or adjusted under 35 U.S.C. 154(b) by 699 days.

(21) Appl. No.: 12/050,112

(22) Filed: Mar. 17, 2008

(65) Prior Publication Data

US 2009/0233751 A1 Sep. 17, 2009

(51) Int. Cl.
*F16H 48/06* (2006.01)

(52) U.S. Cl. .......................................... 475/230; 475/235

(58) Field of Classification Search ................ 475/230, 475/235, 248

See application file for complete search history.

(56) References Cited

U.S. PATENT DOCUMENTS

| | | | |
|---|---|---|---|
| 3,666,257 A * | 5/1972 | Sorteberg | 267/170 |
| 3,791,238 A | 2/1974 | Bokovoy | |
| 4,400,996 A * | 8/1983 | Schou | 74/650 |
| 4,424,725 A | 1/1984 | Bawks | |
| 4,557,158 A | 12/1985 | Dissett et al. | |
| 4,745,818 A | 5/1988 | Edwards et al. | |
| 4,791,832 A * | 12/1988 | McCaw | 475/226 |
| 5,045,038 A * | 9/1991 | Sherlock | 475/235 |
| 5,171,192 A | 12/1992 | Schlosser et al. | |
| 5,176,590 A | 1/1993 | Haydock | |
| 5,524,509 A | 6/1996 | Dissett | |
| 5,591,098 A | 1/1997 | Jones et al. | |
| 5,749,803 A | 5/1998 | Teraoka et al. | |
| 5,947,859 A | 9/1999 | McNamara | |
| 6,309,321 B1 | 10/2001 | Valente | |
| 6,394,927 B1 | 5/2002 | Bongard | |
| 6,432,020 B1 | 8/2002 | Rivera et al. | |
| 7,056,256 B2 | 6/2006 | Asahi | |

* cited by examiner

*Primary Examiner* — Ha D. Ho
(74) *Attorney, Agent, or Firm* — Black Lowe & Graham, PLLC

(57) ABSTRACT

A preloaded differential includes may take the form of a hold-out ring type locking differential having a preloaded thrust assembly that may be insertable in the differential as a one-piece unit. The preloaded thrust assembly includes a pair of thrust members each having complimentarily shaped protruding and recessed portions that interlock after assembly to prevent rotation of the thrust members relative to one another. Further, one or more conical, disc-shaped springs may be located between the thrust members to bias the thrust members directly against side gears positioned within the differential to reduce or prevent radial movement of the side gears. In one embodiment, the thrust members include a friction and thrust contact surface that directly contacts the side gears and the springs are located within a region formed by the interlocking features of the thrust members.

17 Claims, 5 Drawing Sheets

PRELOADED DIFFERENTIALS

FIELD OF THE INVENTION

This invention relates generally to a limited slip or locking differential system of a hold-out-ring type having a preloaded thrust assembly.

BACKGROUND OF THE INVENTION

Differentials for automotive-type applications are used in many front or rear axles to transmit the power from the engine to the driven wheels of the vehicle. Conventional differentials permits a vehicle to turn corners with one wheel rolling faster than the other and generally include two side gears coupled to the output or driven shafts, which in turn are coupled to the respective left and right wheels of the vehicle. The differential case generally includes a ring gear driven by a pinion gear coupled to an end of the vehicle drive shaft driven by the engine. Side gears are located within and coupled to the differential case while typically being splined or otherwise coupled to the respective driven shafts. The side gears may be controlled by various means to permit the driven shafts to power both wheels during most vehicle maneuvers. But when turning, this arrangement of the differential permits the outer wheel to overrun (i.e., rotate faster than) the inner wheel, which lags (i.e., rotates slower). The amount of overrun rate is generally equivalent to the amount of lag.

There are a variety of differential types such as conventional or "open" differentials, limited slip differentials, and lockable or locking differentials. These types are distinguishable by how they handle various possible operating conditions.

Limited slip and locking differentials contain mechanisms and features which cause the differential to prevent or limit rotational speed differences between the left and right driven wheels. Different methodologies are used to actuate these mechanisms. The most common means for actuation of the mechanism in a locking differential are pneumatic, hydraulic, electric, electromechanical, mechanical friction or some combination thereof.

In addition, at least some of these differentials may be characterized as hold-out ring type differentials in which thrust members are engaged by spring devices to outwardly bias the side gears in an axial direction within the differential. One type of hold-out ring type differential is described in U.S. Pat. No. 5,524,509 and teaches that Belleville disc-spring washers may be used to bias the side gears in the axial direction to limit radial movement of the side gears and thus reduce the tooth-to-tooth noise corresponding to an overrunning condition in which the differential is shifting from and engaged to a disengaged condition. Some other conventional differentials of the hold-out ring type are described in U.S. Pat. No. 3,791,238 (Bokovoy), U.S. Pat. No. 4,424,725 (Bawks), U.S. Pat. No. 4,557,158 (Dissett et al.), and U.S. Pat. No. 4,745,818 (Edwards et al.).

SUMMARY OF THE INVENTION

The present invention is generally related to a limited slip or locking differential of the hold-out ring type having a preloaded thrust assembly. In one embodiment, the differential may take the form of a hold-out ring type locking differential having a preloaded thrust assembly that may be insertable in the differential as a one-piece unit. The preloaded thrust assembly includes a pair of thrust members each having complimentarily shaped protruding and recessed portions that interlock after assembly to prevent rotation of the thrust members relative to one another. Further, a conical, disc-shaped spring may be located between the thrust members to bias the thrust members directly against side gears positioned within the differential to reduce or prevent radial movement of the side gears. In one embodiment, the thrust members include a friction and thrust contact surface that directly contacts the side gears and the spring is located within a region formed by the interlocking features of the thrust members.

In one aspect of the invention, a preloaded thrust assembly installable into a differential system includes a first thrust member having an inner portion and an outer portion located on an outwardly facing side of the first thrust member. The inner portion extends between the outer portion and a central portion. The outer portion extends between the inner portion and a radial periphery of the first thrust member and includes a contact surface located proximate the radial periphery and configured to directly contact a first side gear of the differential system after installation of the preloaded thrust assembly into the differential system. The first thrust member includes at least one protruding portion located adjacent to at least one recessed portion located on an inwardly facing side of the first thrust member. A second thrust member includes an inner portion and an outer portion located on an outwardly facing side of the second thrust member. The inner portion extends between the outer portion and a central portion. The outer portion extends between the inner portion and a radial periphery of the second thrust member and includes a contact surface located proximate the radial periphery and configured to directly contact a second side gear of the differential system after installation of the preloaded thrust assembly into the differential system. The second thrust member includes at least one protruding portion located adjacent to at least one recessed portion located on an inwardly facing side of the second thrust member, in which the protruding and recessed portions of the second thrust member arranged to complementarily cooperate with the protruding and recessed portions of the first thrust member to prevent rotation of the thrust members relative to one another. In addition, at least one biasing device is received between the inwardly facing sides of the first and second thrust members to bias the thrust members axially apart from one another after installation of the preloaded thrust assembly into the differential system.

In another aspect of the invention, a differential system includes a differential housing, first and second side gears located in the differential housing, thrust members, and at least one biasing device. The thrust members each having an inner portion and an outer portion located on an outwardly facing side of the thrust member, the inner portion extends between the outer portion and a central portion. The outer portion extends between the inner portion and a radial periphery of the respective thrust members and includes a contact surface located proximate the radial periphery. The respective contact surfaces of each thrust member are configured to directly contact a corresponding side gear. Further, the thrust members each have complementarily cooperating protruding and recessed portions located on an inwardly facing side of the thrust member to prevent rotation of the thrust members relative to one another. In addition, at least one biasing device is received between the inwardly facing sides of the first and second thrust members axially apart from one another to preload the side gears with respect to the differential housing.

In yet another aspect of the invention, a method of assembling a preloaded differential system includes arranging a first conical, disc-shaped spring in a back-to-back relationship with a second, conical, disc-shaped spring. A convex surface of the first conical, disc-shaped spring abuts a convex surface of the second conical, disc-shaped spring. Next, the springs are placed within a region formed between a pair of thrust members, where the region is located within an inner diameter region formed by protruding portions extending axially from the thrust members. The thrust members may then be moved into an interlocking relationship with the springs captured within the region, wherein the interlocking relationship substantially prevents rotation of the thrust members relative to one another. The interlocked thrust members and the springs comprise a thrust assembly, which in turn may then be inserted or installed between first and second side gears located in the differential system. Once installed, the thrust assembly may be released; and through operation of the spring, the thrust members are biased apart and urged to directly engage corresponding surfaces of the side gears with the respective contact surfaces of the thrust members.

BRIEF DESCRIPTION OF THE DRAWINGS

The sizes and relative positions of elements in the drawings or images may not necessarily be to scale. For example, some elements may be arbitrarily enlarged or otherwise modified to improve clarity. Further, the illustrated shapes of the elements may not convey their actual shapes, and have been solely selected for ease of recognition. Various embodiments are briefly described with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details or with various combinations of these details. In other instances, well-known structures and methods associated with differential systems, driving and output mechanisms for the differential systems, and sub-assemblies located within a housing of the differential system, and methods of assembling, operating and using the same may not be shown or described in detail to avoid unnecessarily obscuring descriptions of the embodiments of the invention.

One preferred example of the invention takes the form of a hold-out ring type locking differential for an automobile or other type of motorized vehicle. The hold-out ring type locking differential advantageously includes a preloaded thrust assembly that may be insertable in the differential as a one-piece unit, which reduces an overall assembly time of the differential. The preloaded thrust assembly, in turn, may include a pair of thrust members each having complimentarily shaped protruding and recessed portions that interlock or cooperate after assembly to prevent rotation of the thrust members relative to one another. Further, a conical, disc-shaped spring may be located between the thrust members to bias the thrust members directly against side gears positioned within the differential to reduce or prevent radial movement of the side gears. In one embodiment, the thrust members include a friction and thrust contact surface that directly contacts the side gears and allows for greater torque bias with less spring load as compared to conventional hold-out ring type locking differentials, such as the differential described in U.S. Pat. No. 5,524,509. And in contrast to the side gears described in U.S. Pat. No. 5,524,509, the side gears of the differential described herein may be manufactured with a simpler design that does not include axial extending slots to receive the thrust members. As a result, the overall cost of the differential may be reduced because the side gears are less expensive to machine and the preloaded thrust assembly may be pre-assembled and then inserted into the differential as a one-piece unit.

Figure 1:
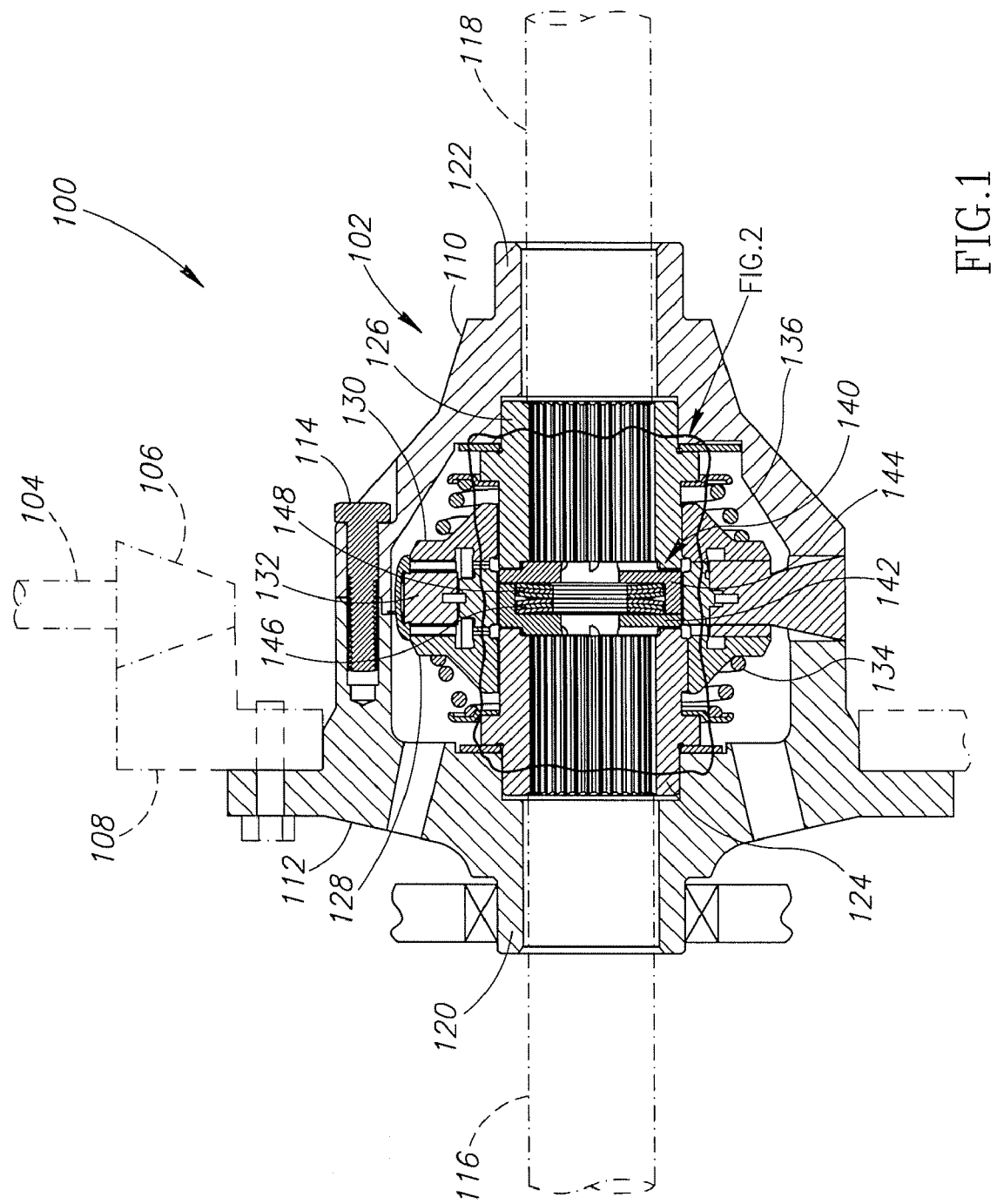
FIG. 1 is a cross-sectional view of a differential system having a preloaded thrust assembly according to one illustrated embodiment of the invention.

FIG. 1 shows a differential system 100 having a two-piece sectional housing 102 that is rotatably driven by a vehicle drive shaft 104 through a drive pinion gear 106 and a corresponding ring gear 108 according to an embodiment of the illustrated invention The housing 102 includes a first section 110 coupled to a second section 112 using fasteners 114, which may take the form of bolts. Output or driven shafts 116, 118 are received in opposite end portions 120, 122 of the housing 102. The driven shafts 116, 118 drive the left and right wheels (not shown), respectively, of a vehicle. In turn, the driven shafts 116, 118 are coupled to the differential system 100 through respective side gears 124, 126. In the illustrated embodiment, the side gears 124, 126 are splined to their corresponding drive shafts 116, 118.

The differential system 100 further includes clutch members 128, 130 coupled to a center driving member 132 and to the side gears 124, 126, respectively. The clutch members 128, 130 are normally biased toward the center driving member 132 with compression springs 134, 136, respectively. During normal driving conditions, the driven shafts 116, 118 are driven at the same speed by drive shaft 104 and through the gear train established by the meshed connectivity to the differential housing 102, the pinion 106, the ring gear 108, the center drive member 132, the clutch members 128, 130, the side gears 124, 126 and finally to the driven shafts 116, 118, respectively.

During a turning condition and specifically as the vehicle makes a left hand turn, the rotational velocity of the driven shaft 118 (e.g., driving the right or outside wheel) exceeds that of the driven shaft 116 (e.g., driving the left or inside wheel). Due to the meshed engagement of the clutch members 128, 130 with the center driving member 132, the clutch member 130 translates to overcome the biasing force of the compression spring 136 and thus become disengaged from the center driving member 132. In turn, this permits the driven shaft 118 to rotate at a higher velocity than the driven shaft 116 during the left hand turn. Such a turning condition may be commonly and generally referred to as an overrunning condition. After the turn has been completed, the above-described gear train and in particular the clutch member 130 resumes its normal operating configuration.

Figure 2:
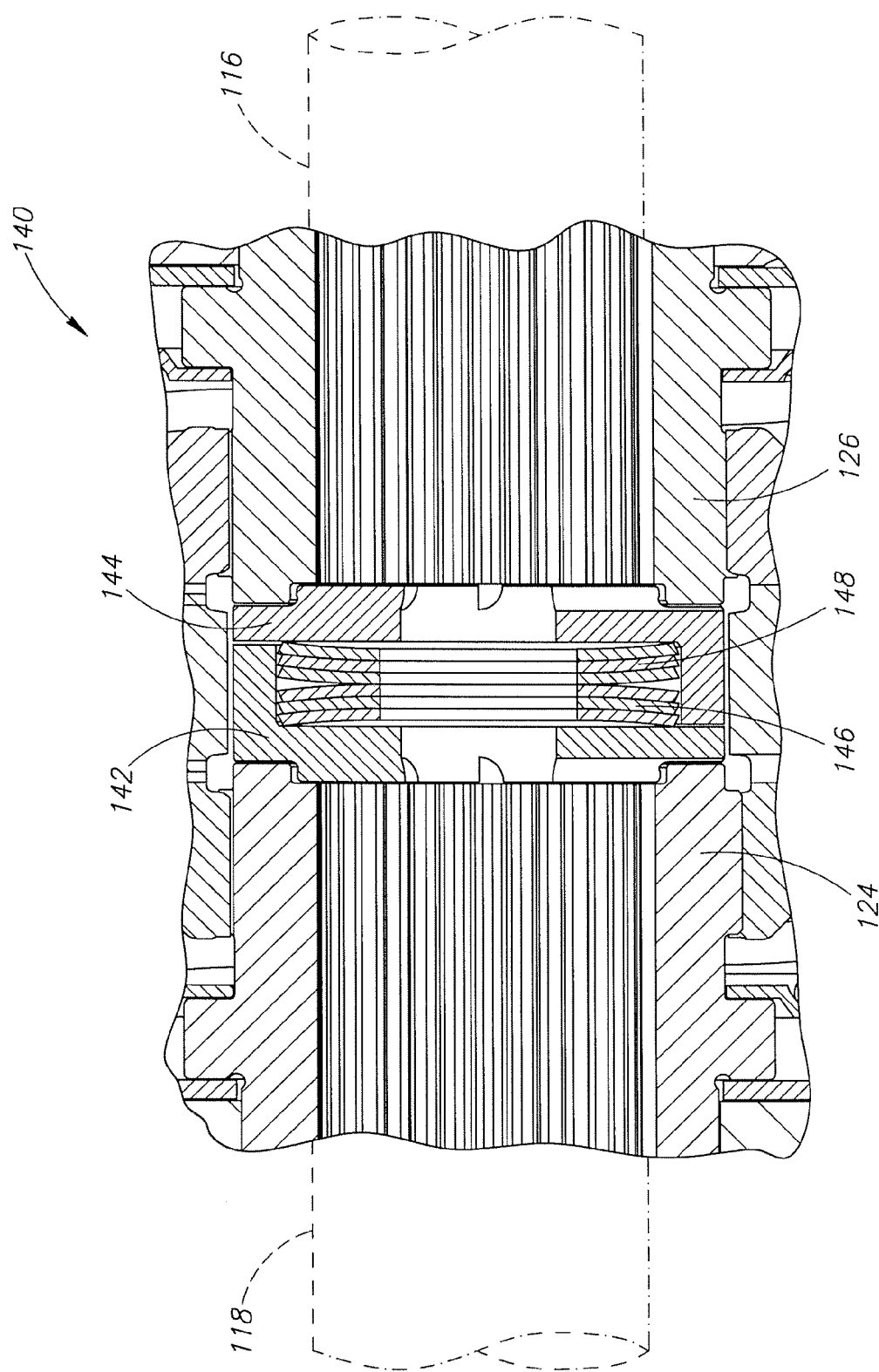
FIG. 2 is a close-up of the cross-sectional view of the preloaded thrust assembly of FIG. 1 arranged with side gears from the differential according to one illustrated embodiment of the invention.

To better control a radial displacement of the side gears 124, 126 that may occur during the turning condition and/or loading/unloading of the differential assembly, either of which may cause chatter or noise, the differential system 100 includes a preloaded thrust assembly 140 according to the illustrated embodiment of FIG. 1 and better shown in close-up in FIG. 2. In one embodiment, the preloaded thrust assembly 140 includes a pair of interlocking thrust members 142, 144 and biasing stacks 146, 148 arranged in a back-to-back relationship. In the illustrated embodiment, each biasing stack 146, 148 takes the form of three conical, disc-shaped members. However, each biasing stack 146, 148 may take other forms such as a single conical, disc-shaped member or multiple conical, disc-shaped members (e.g., two or more) in nested, symmetrically mirrored, or other operable configurations.

Figure 3:
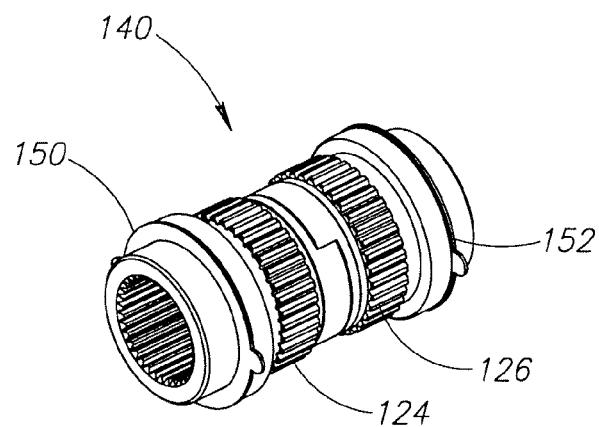
FIG. 3 is a top, right, isometric view of the preloaded thrust assembly of FIG. 1 arranged with side gears from the differential.
Figure 4:
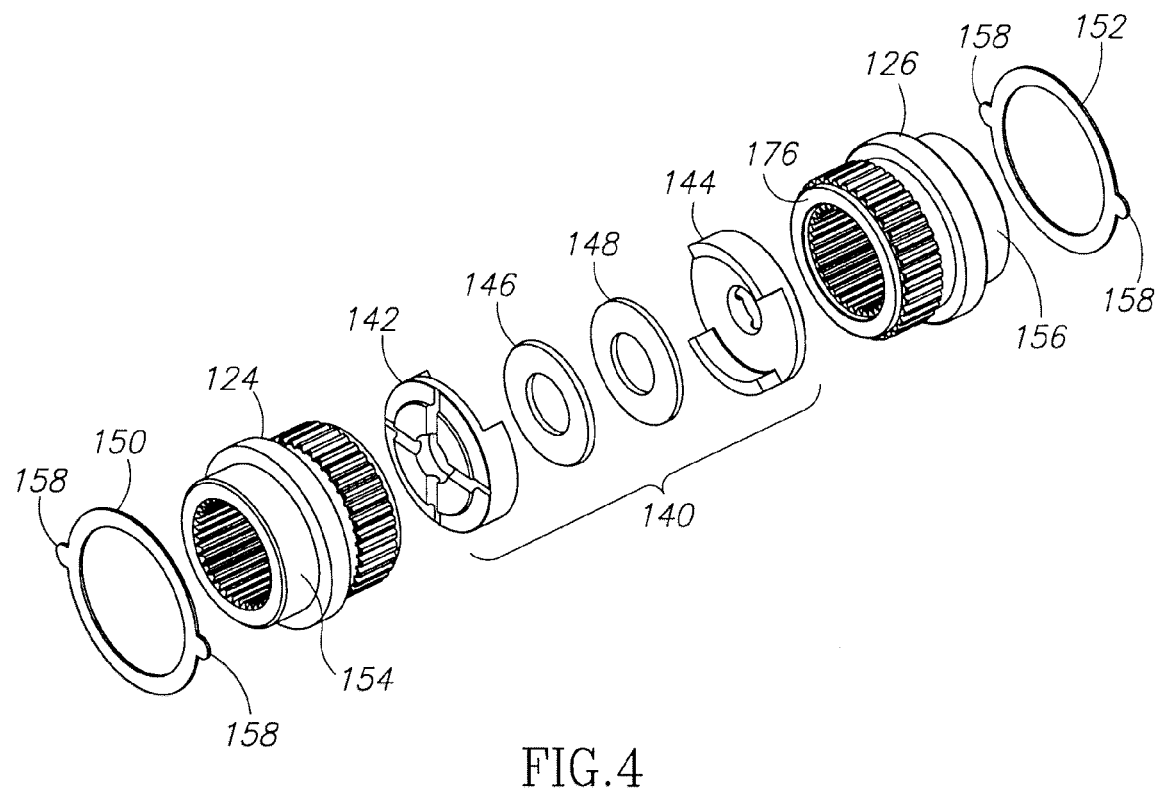
FIG. 4 is a top, right, exploded, isometric view of the preloaded thrust assembly of FIG. 1 arranged with side gears and tabbed thrust washers from the differential.

FIGS. 3 and 4 shows the preloaded thrust assembly 140 with the side gears 124, 126 and with tabbed thrust washers 150, 152 according to an illustrated embodiment of the present invention. The tabbed thrust washers 150, 152 are closely received onto axially extending end surfaces 154, 156 of the side gears 124, 126. Tabs 158 of the tabbed thrust washers 150, 152 engage the housing 102 (FIG. 1).

Figure 5:
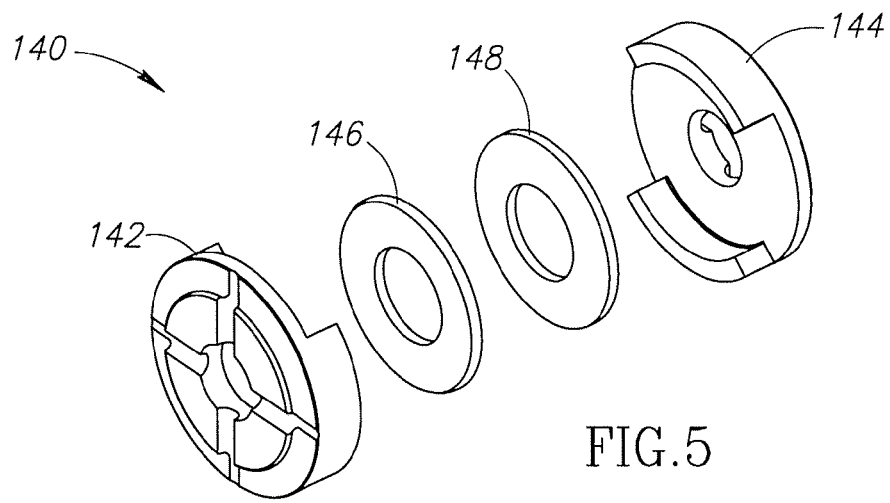
FIG. 5 top, right, exploded, isometric view of the preloaded thrust assembly of FIG. 1.
Figure 6:
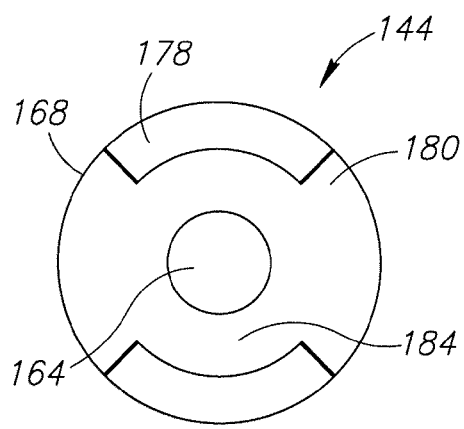
FIG. 6 is a plan view of one side of a thrust member from the preloaded thrust assembly of FIG. 5 according to one illustrated embodiment of the invention.
Figure 7:
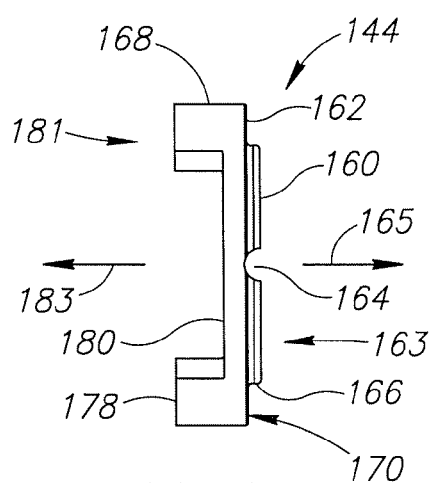
FIG. 7 is side elevational view of the thrust member from FIG. 6.
Figure 8:
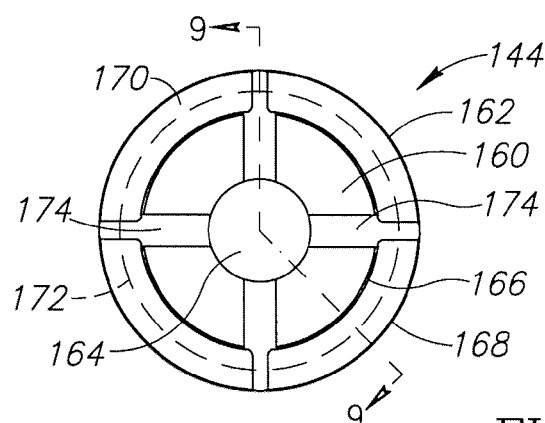
FIG. 8 is a plan view of an opposite side of the thrust member of FIG. 6.
Figure 10:
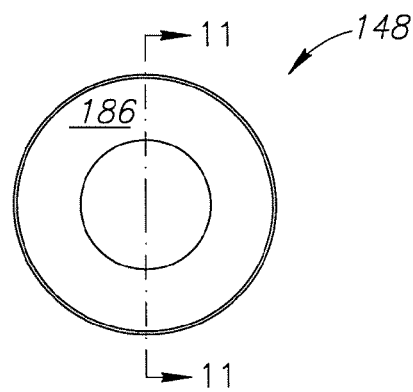
FIG. 10 is a plan view of a convex side of a conical disc-shaped spring from the preloaded thrust assembly of FIG. 5 according to one illustrated embodiment of the invention.
Figure 11:
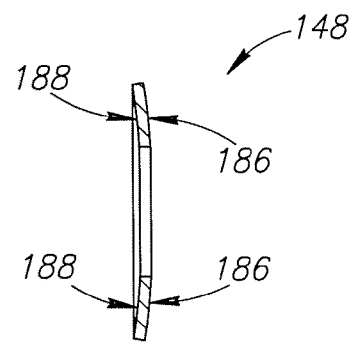
FIG. 11 is a cross-sectional view of the conical disc-shaped spring of FIG. 10 taken along line 11-11 of FIG. 10.

FIG. 5 shows the preloaded thrust assembly 140 while most of the details regarding the thrust members 142, 144 are described with respect to FIGS. 6-9 and most of the details regarding the biasing stacks 146, 148 are described with respect to FIGS. 10 and 11. In the illustrated embodiment, the thrust members 142, 144 interact with one another as will be described in further detail below.

By way of example, FIGS. 6-9 show various views of the thrust member 144, which includes an inner portion 160 and an outer portion 162 located on an outwardly facing side 163 of the thrust member 144. In the illustrated embodiment, the term outwardly refers to a normal direction indicated by arrow 165 extending from the outwardly facing side 163, but not extending through the thrust member 144. The inner portion 160 extends between a central portion 164 and a shoulder 166 that operates as the interface or boundary between the inner and outer portions 160, 162. The central portion 164 may take the form of a central opening extending through the through the thrust member 144. Likewise, the outer portion 162 extends between the shoulder 166 and a radial periphery or radial edge 168 of the thrust member 144. The outer portion 162 further functions as a thrust surface 170 sized to directly make contact with the side gear 126 (FIG. 4). In one embodiment, the thrust surface 170 includes a mean thrust diameter 172. By arranging the thrust surface 170 to directly engage or make contact with the side gear 126 (FIG. 4) and by configuring the mean thrust diameter 172 to be substantially, diametrically outward results in the thrust member 144 having more torque bias with a lower spring load when compared to the conventional thrust assembly devices, such as the device described in U.S. Pat. No. 5,524,509. In addition and according to at least one other embodiment, the thrust member 144 includes radially extending channels 174 configured to receive a lubricant, such as oil, which in turn allows the lubricant to move or travel between the thrust surface 170 of the thrust member 144 and a corresponding thrust surface 176 (FIG. 4).

Figure 9:
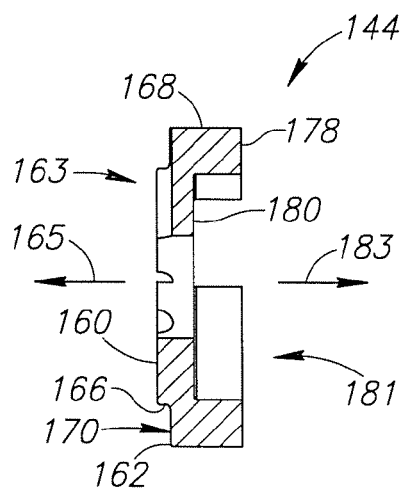
FIG. 9 is cross-sectional view of the thrust member of FIG. 6 taken along line 9-9 of FIG. 8.
Figure 9A:
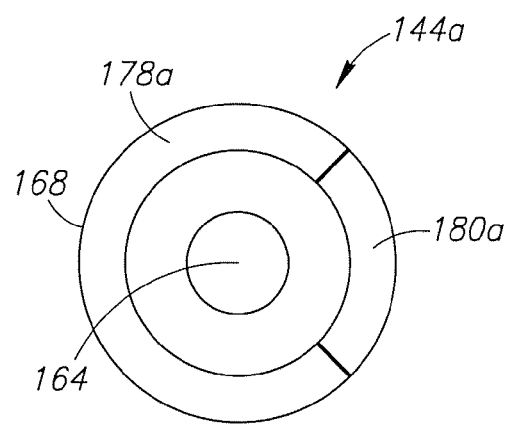
FIG. 9A is a plan view of one side of a thrust member from a preloaded thrust assembly according to another illustrated embodiment of the invention.

Still referring to FIGS. 6-9, the thrust member 144 includes at least one protruding portion 178 and at least one recessed portion 180 located on an inwardly facing side 181 of the thrust member 144. In the illustrated embodiment, the term inwardly refers to a normal direction indicated by arrow 183 extending from the inwardly facing side 181, but not extending through the thrust member 144. The protruding portion 178 and the recessed portion 180 are located proximate the radial periphery 168 and distally from the central portion 164. In the illustrated embodiment, the thrust member 144 includes two protruding portions 178 and two recessed portions 180 that are rotationally arranged to cooperate or interlock with corresponding protruding and recessed portions (not labeled) on thrust member 142. FIG. 9A shows another embodiment of a thrust member 144a having only one protruding portion 178a and one recessed portion 180a.

The protruding and recessed portions 178, 180 may take a variety of configurations, for example one, two or more protruding portions formed on one thrust member that complementarily engage with corresponding recessed portions on the other thrust member. Nevertheless, the protruding and recessed portions 178, 180 operate to prevent rotation of the thrust members relative to one another.

After the thrust members 142, 144 are assembled together, corresponding interior radial regions 184 cooperate to form a cavity for receiving the conical, disc-shaped springs 146, 148 (FIG. 5). The arrangement of the thrust assembly 140 as described herein advantageously isolates the friction or contact surface to be between the thrust members 142, 144 and the respective side gears 124, 126. Further, a close fit between the protruding and recessed portions 178, 180 of the thrust members 142, 144 may prevent excessive rotation of the thrust members relative to one another and in turn prevent backlash from being added to the system. By reducing or eliminating backlash from being added to the system, the side gears 124, 126 are not permitted to rotate more than a desired amount without the friction force from the thrust members 142, 144.

FIGS. 10 and 11 show the biasing stack 148 for purposes of brevity and clarity, which in the illustrated embodiment takes the form of a single, conical, disc-shaped member. Conical, disc-shaped members are commonly referred to as Belleville springs and generally take the form of conically, disc-shaped washers designed to be loaded in an axial direction only. Such conical, disc-shaped springs may be statically or dynamically loaded depending on the application where they are employed. The spring stiffness of a conical, disc-shaped spring assembly may be varied by stacking the springs into a stacked column and/or by designing each spring with different spring characteristics (e.g., thickness, amount of curvature, material, inner and outer diameter, etc.). The conical disc-shaped springs described herein may take the general form of a concavo-convex shaped spring, for example one side having a convex-shaped surface 186 and an opposite side having a concave or conically shaped surface 188. In addition, if two springs 148 are used, for example, the springs 148 may be arranged in a symmetrically mirrored configuration with respect to one another.

Many other changes can be made in light of the above detailed description. In general, in the following claims, the terms used should not be construed to limit the invention to the specific embodiments disclosed in the specification and the claims, but should be construed to include all types of differentials, gears, gear systems, actuation systems, differential cases, preloaded thrust assemblies and methods of assembling the same that operate in accordance with the claims. Accordingly, the invention is not limited by the disclosure, but instead its scope is to be determined entirely by the following claims.

What is claimed is:

1. A preloaded thrust assembly installable into a differential system, the preloaded thrust assembly comprising:
    a first thrust member having an inner portion and an outer portion located on an outwardly facing side of the first thrust member, the inner portion extending between the outer portion and a central portion, the outer portion extending between the inner portion and a radial periphery of the first thrust member, the outer portion having a contact surface located proximate the radial periphery and configured to directly contact a first side gear of the differential system after installation of the preloaded thrust assembly into the differential system, the first thrust member further having at least one protruding portion located adjacent to at least one recessed portion located on an inwardly facing side of the first thrust member;
    a second thrust member having an inner portion and an outer portion located on an outwardly facing side of the second thrust member, the inner portion extending between the outer portion and a central portion, the outer portion extending between the inner portion and a radial periphery of the second thrust member, the outer portion having a contact surface located proximate the radial periphery and configured to directly contact a second side gear of the differential system after installation of the preloaded thrust assembly into the differential system, the second thrust member further having at least one protruding portion located adjacent to at least one recessed portion located on an inwardly facing side of the second thrust member, the protruding and recessed portions of the second thrust member arranged to complementarily cooperate with the protruding and recessed portions of the first thrust member to prevent rotation of the thrust members relative to one another; and
    at least one biasing device received between the inwardly facing sides of the first and second thrust members to bias the thrust members axially apart from one another after installation of the preloaded thrust assembly into the differential system.

2. The preloaded thrust assembly of claim 1, wherein the first and second thrust members are structurally identical components.

3. The preloaded thrust assembly of claim 1, wherein the at least one biasing device includes a conical, disc-shaped configuration.

4. The preloaded thrust assembly of claim 3, further comprising another biasing device having a conical, disc-shaped configuration, wherein a convex surface of the at least one biasing device abuts a convex surface of the another biasing device.

5. The preloaded thrust assembly of claim 4, wherein the concave surface of the at least one biasing device faces in an opposite direction from the concave surface of the another biasing device.

6. The preloaded thrust assembly of claim 1, wherein a circumferential length of the protruding portion of the first thrust member is substantially equal to a circumferential length of the recessed portion of the first thrust member.

7. The preloaded thrust assembly of claim 1, wherein a circumferential length of the protruding portion of the second thrust member is substantially equal to a circumferential length of the recessed portion of the second thrust member.

8. The preloaded thrust assembly of claim 1, wherein the contact surface of the first thrust member frictionally and thrustingly contacts the first side gear of the differential system after installation of the preloaded assembly.

9. The preloaded thrust assembly of claim 1, wherein the contact surface of the second thrust member frictionally and thrustingly contacts the second side gear of the differential system after installation of the preloaded assembly.

10. The preloaded thrust assembly of claim 1, wherein an outer diameter of the at least one biasing device is smaller than an inner diameter of the protruding portion of the first thrust member.

11. The preloaded thrust assembly of claim 1, wherein an outer diameter of the at least one biasing device is smaller than an inner diameter of the protruding portion of the second thrust member.

12. The preloaded thrust assembly of claim 1, further comprising another biasing device, wherein both biasing devices are arranged in a symmetrically mirrored configuration with respect to one another.

13. A differential system comprising:
    a differential housing;
    first and second side gears located in the differential housing;
    first and second thrust members each having an inner portion and an outer portion located on an outwardly facing side of the thrust member, the inner portion extending between the outer portion and a central portion, the outer portion extending between the inner portion and a radial periphery of the respective thrust member, the outer portion having a contact surface located proximate the radial periphery, each contact surface configured to directly contact a respective side gear, the first and second thrust members each further having complementarily cooperating protruding and recessed portions located on an inwardly facing side of the thrust member to prevent rotation of the thrust members relative to one another; and
    at least one biasing device received between the inwardly facing sides of the first and second thrust members to bias the thrust members axially apart from one another to preload the side gears with respect to the differential housing.

14. The differential system of claim 13, wherein the first and second thrust members are structurally identical components.

15. The differential system of claim 13, wherein the at least one biasing device is a conical, disc-shaped spring.

16. The differential system of claim 15, further comprising another biasing device having a conical, disc-shaped configuration, wherein a convex surface of the at least one biasing device abuts a convex surface of the another biasing device.

17. The differential system of claim 13, further comprising another biasing device, wherein both biasing devices are arranged in a symmetrically mirrored configuration with respect to one another.

* * * * *